(12) United States Patent
Nachtigall

(10) Patent No.: US 8,621,230 B2
(45) Date of Patent: Dec. 31, 2013

(54) SYSTEM AND METHOD FOR SECURE VERIFICATION OF ELECTRONIC TRANSACTIONS

(75) Inventor: Ernest H. Nachtigall, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 1136 days.

(21) Appl. No.: 11/859,957

(22) Filed: Sep. 24, 2007

(65) Prior Publication Data

US 2008/0077798 A1    Mar. 27, 2008

(30) Foreign Application Priority Data

Sep. 26, 2006 (CA) .................................... 2561077

(51) Int. Cl.
*H04L 29/06*    (2006.01)
(52) U.S. Cl.
USPC ......................................................... 713/184
(58) Field of Classification Search
USPC ......................................................... 713/184
See application file for complete search history.

(56) References Cited

U.S. PATENT DOCUMENTS

| | | | | |
|---|---|---|---|---|
| 4,500,750 A | * | 2/1985 | Elander et al. ................ | 705/72 |
| 5,475,756 A | * | 12/1995 | Merritt ........................... | 705/73 |
| 5,731,575 A | * | 3/1998 | Zingher et al. ............... | 235/379 |
| 7,571,468 B1 | * | 8/2009 | Williams ........................ | 726/9 |
| 2002/0198848 A1 | * | 12/2002 | Michener ....................... | 705/75 |
| 2004/0143556 A1 | | 7/2004 | Graubart et al. | |
| 2004/0164145 A1 | * | 8/2004 | Licciardello et al. ......... | 235/381 |
| 2005/0085931 A1 | * | 4/2005 | Willeby .......................... | 700/89 |
| 2005/0166263 A1 | | 7/2005 | Nanopoulos et al. | |
| 2008/0040138 A1 | * | 2/2008 | Hinz et al. ..................... | 705/1 |

FOREIGN PATENT DOCUMENTS

GB             233067        5/1993

* cited by examiner

*Primary Examiner* — Darren B Schwartz
*Assistant Examiner* — John B King
(74) *Attorney, Agent, or Firm* — Andrea Bauer; Hoffman Warnick LLC

(57) ABSTRACT

The present invention relates to a system and method for secure verification of electronic transactions, and in particular secure processing of personal identification numbers when third party processors are involved. In an embodiment, a variable length PIN associated with a credit card or debit card is encrypted, then hashed using a one-way hash algorithm before it is passed along to and stored by a third party processor. The encrypted-hashed PIN always remains in an encrypted form while in the hands of the third party processor. At the third party processor, secure cryptographic hardware is used to store the one-way hash algorithm. Encrypted PIN values received for verification are converted and hashed using the one-way hash algorithm, and the resulting hashed-encrypted value is compared against the hashed-encrypted PIN values previously stored at the third party processor. As the PIN has a variable length, and the third party processor has no access to the hash algorithm, the encrypted PIN values are highly resistant to reverse engineering or decryption.

16 Claims, 3 Drawing Sheets

SYSTEM AND METHOD FOR SECURE VERIFICATION OF ELECTRONIC TRANSACTIONS

COPYRIGHT NOTICE

A portion of the disclosure of this patent document contains material which is subject to copyright protection. The copyright owner has no objection to the facsimile reproduction of the patent document or the patent disclosure, as it appears in the United States Patent and Trademark Office patent file or records, but otherwise reserves all copyright rights whatsoever.

BACKGROUND OF THE INVENTION

1. Field of the Invention

The present invention relates to systems and methods for verification of electronic transactions, and in particular secure processing of personal identification numbers.

2. Related Art

Electronic payments for goods and services has become commonplace, and payment via a credit card or bank card/debit card is now widely available at many retail locations as well as at many virtual store locations on the internet. As the use of electronic payment grows, the need for secure verification by third party processors is also increasing. However, involving third party processors may involve the need to disclose secure cryptographic keys that may compromise control by the owning banking institution. While various approaches have been proposed for offering secure verification for electronic payments, these approaches may exhibit limitations, especially when third party processing is involved.

Accordingly, there is a need for an improved method and system for secure verification of electronic transactions and PIN processing.

SUMMARY OF THE INVENTION

The present invention provides a system and method for secure verification of electronic transactions, and in particular secure processing of personal identification numbers when third party processors are involved.

In an embodiment, a variable length PIN associated with a credit card or debit card is encrypted, then hashed using a one-way hash algorithm before it is passed along to and stored by a third party processor. The encrypted-hashed PIN always remains in an encrypted form while in the hands of the third party processor. At the third party processor, secure cryptographic hardware is used to store the one-way hash algorithm. Encrypted PIN values received for verification (e.g., from a retail point-of-sale terminal) are converted and hashed using the one-way hash algorithm, and the resulting hashed-encrypted value is compared against the hashed-encrypted PIN values previously stored at the third party processor. As the PIN has a variable length, and the third party processor has no access to the hash algorithm, the encrypted PIN values are highly resistant to reverse engineering or decryption.

In an aspect of the invention, there is provided a method of processing a personal identification number (PIN), comprising: encrypting at an owning institution processor a clear PIN input using an encryption algorithm to generate a first encrypted PIN; hashing at the owning institution processor the first encrypted PIN using a one-way hash algorithm to generate a first hashed-encrypted PIN; and storing at a third party processor the first hashed-encrypted PIN.

In an embodiment, the method further comprises: receiving at the third party processor a second encrypted PIN generated from a clear PIN input; translating at the third party processor the second encrypted PIN into a third encrypted PIN in a form usable by the third party processor; hashing at the third party processor the third encrypted PIN using the one-way hash algorithm to generate a second hashed-encrypted PIN; and comparing at the third party processor the second hashed-encrypted PIN to the stored first hashed-encrypted PIN to determine if the second encrypted PIN is generated from the same clear PIN input as that of the first encrypted PIN.

In an embodiment, the method further comprises securing at the third party processor the one-way hash algorithm in cryptographic hardware.

In an embodiment, the method further comprises receiving at the owning institution processor a user generated clear PIN input.

In an embodiment, the user generated clear PIN input has a variable length, and the method further comprises generating at the owning institution processor the first hashed-encrypted PIN from the variable length PIN, and storing at the third party processor the first hashed-encrypted PIN from the variable length PIN.

In an embodiment, the method further comprises receiving at the third party processor the second encrypted PIN generated from a clear PIN input; translating at the third party processor the second encrypted PIN into a third encrypted PIN in a form usable by the third party processor; hashing at the third party processor the third encrypted PIN using the one-way hash algorithm to generate a second hashed-encrypted PIN; and comparing at the third party processor the second hashed-encrypted PIN to the stored first hashed-encrypted PIN to determine if the second encrypted PIN is generated from the same variable length clear PIN input as that of the first encrypted PIN.

In another aspect of the invention, there is provided a system for processing a personal identification number (PIN), comprising: an encryption algorithm module provided at an owning institution processor and configured to encrypt a clear PIN input and to generate a first encrypted PIN; a one-way hash algorithm module provided at the owning institution processor and configured to hash the first encrypted PIN and to generate a first hashed-encrypted PIN; and storage provided at the third party processor for storing the first hashed-encrypted PIN.

In an embodiment, the system further comprises: a PIN translator module provided at the third party processor for translating a second encrypted PIN into a third encrypted PIN in a form usable by the third party processor; a one-way hash algorithm module provided at the third party processor for hashing the third encrypted PIN to generate a second hashed-encrypted PIN; and a comparison module provided at the third party processor for comparing the second hashed-encrypted PIN to the stored first hashed-encrypted PIN to determine if the second encrypted PIN is generated from the same clear PIN input as that of the first encrypted PIN.

In another embodiment, the system further comprises cryptographic hardware provided at the third party processor for securing the one-way hash algorithm.

In another embodiment, the system further comprises receiving means provided at the owning institution processor for receiving a user generated clear PIN input.

In another embodiment, the system further comprises a PIN translator module provided at the third party processor for translating a second encrypted PIN into a third encrypted PIN in a form usable by the third party processor; a one-way hash algorithm module provided at the third party processor for hashing the third encrypted PIN to generate a second hashed-encrypted PIN; and a comparison module provided at the third party processor for comparing the second hashed-encrypted PIN to the stored first hashed-encrypted PIN to determine if the second encrypted PIN is generated from the same clear PIN input as that of the first encrypted PIN.

In another embodiment, the system further comprises cryptographic hardware provided at the third party processor for securing the one-way hash algorithm.

In another aspect of the invention, there is provided a computer readable medium storing computer code that when loaded into one or more data processors adapts the processors to provide, when executed, a method of processing a personal identification number (PIN), the computer readable medium comprising: code for encrypting at a owning institution processor a clear PIN input using an encryption algorithm to generate a first encrypted PIN; code for hashing at the owning institution processor the first encrypted PIN using a one-way hash algorithm to generate a first hashed-encrypted PIN; and code for storing at a third party processor the first hashed-encrypted PIN.

In another embodiment, the computer readable medium further comprises: code for receiving at the third party processor a second encrypted PIN generated from a clear PIN input; code for translating at the third party processor the second encrypted PIN into a third encrypted PIN in a form usable by the third party processor; code for hashing at the third party processor the first encrypted PIN using the one-way hash algorithm to generate a second hashed-encrypted PIN; and code for comparing at the third party processor the second hashed-encrypted PIN to the stored first hashed-encrypted PIN to determine if the second encrypted PIN is generated from the same clear PIN input as that of the first encrypted PIN.

In another embodiment, the computer readable medium further comprises code for receiving a user generated clear PIN input.

In another embodiment, the user generated clear PIN input has a variable length, and the computer readable medium further comprises code for generating the first hashed-encrypted PIN from the variable length PIN at the owning institution processor and storing the first hashed-encrypted PIN from the variable length PIN at the third party processor.

In another embodiment, the computer readable medium further comprises code for securely accessing the one-way hash algorithm secured in cryptographic hardware at the third party processor.

These and other aspects of the invention will become apparent from the following more particular descriptions of exemplary embodiments.

BRIEF DESCRIPTION OF THE DRAWINGS

These and other features of the present invention will be more readily understood from the following detailed description taken in conjunction with the accompanying drawings.

DETAILED DESCRIPTION OF THE INVENTION

As noted above, the present invention relates to a system and method for secure verification of electronic transactions, and in particular secure processing of personal identification numbers or PINs.

Figure 1:
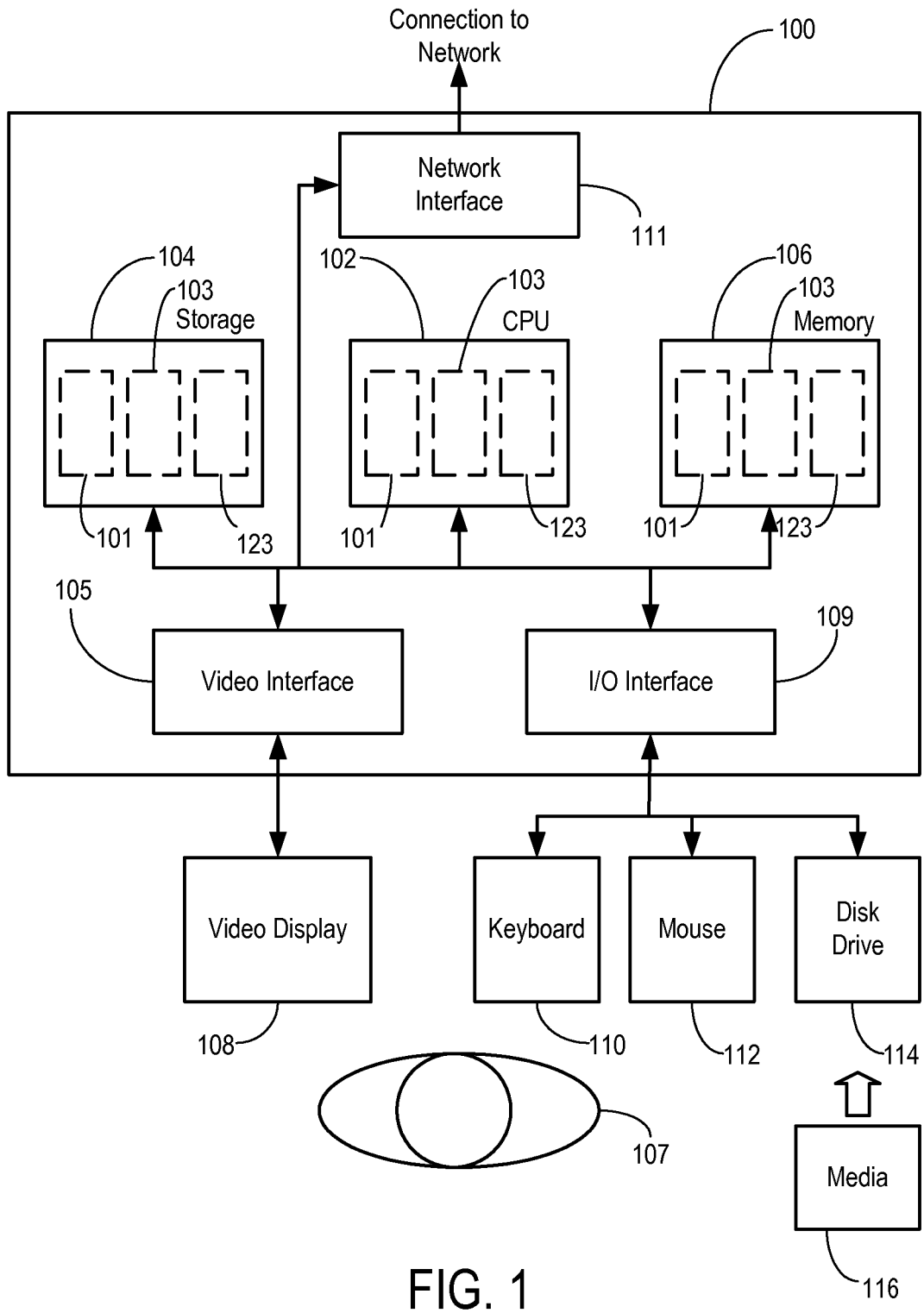
FIG. 1 shows a generic data processing system that may provide a suitable operating environment.

The invention may be practiced in various embodiments. A suitably configured data processing system, and associated communications networks, devices, software, and/or firmware may provide a platform for enabling the system and method. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface ("GUI") controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown).

The particular configurations shown by way of example in this specification are not meant to be limiting. For example, in a mainframe environment, video interface 105, video display 108, keyboard 100, and mouse 112 may be provided at a workstation operatively connected to a mainframe (not shown), and not at the mainframe itself.

Figure 2:
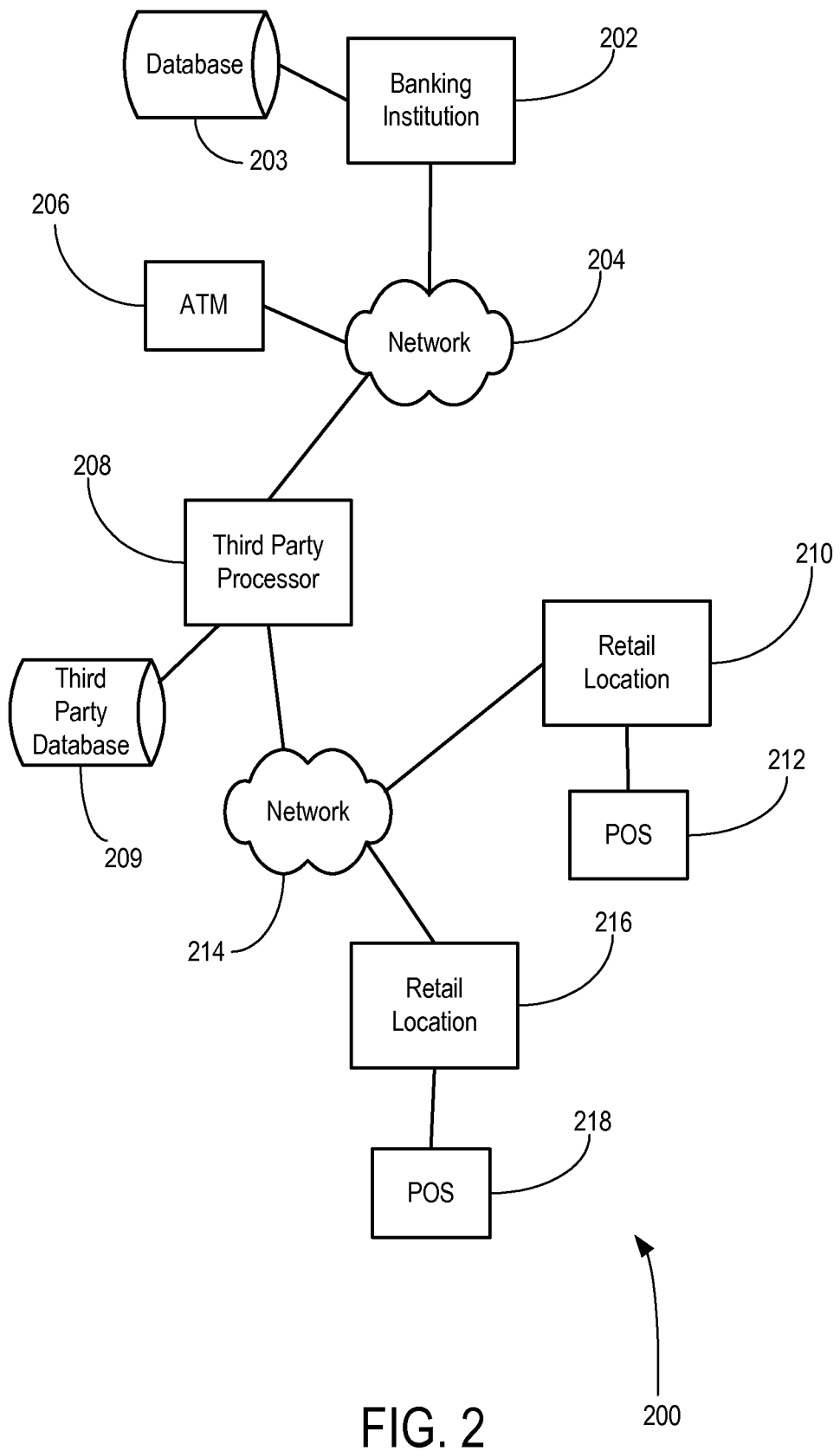
FIG. 2 shows a schematic block diagram of an illustrative PIN verification system.

Now referring to FIG. 2, shown is a schematic block diagram of an illustrative electronic transaction verification system 200 that may include one or more data processing systems 100 suitably configured for various purposes. As shown, electronic transaction verification system 200 may include a banking institution 202 connected via a network 204 to its own automated teller machine (ATM) 206. The banking institution 202 may maintain a banking institution database 203 containing information on debit cards or credit cards issued to various customers. In a closed environment involving only the banking institution 202 and its ATMs 206, the banking institution 202 processes its own electronic payment transactions and validates PINs entered by its customers at ATM 206 by accessing records stored in database 203.

Typically, PIN processing is one of the most secure areas within any bank as any security breach may be devastating from a reputation standpoint, as well as from the viewpoint of exposure to legal risks. Nevertheless, in order to provide enhanced banking services, the banking institution 202 may want a third party processor to have the ability to process electronic transactions on its behalf. This may be done, for example, in situations where the banking institution 202 may not able to verify the transaction itself (e.g., due to a communication problem or system maintenance, or because of geographic location).

Still referring to FIG. 2, banking institution 202 may be connected via network 204 to a third party processor 208. The third party processor 208 may be, for example, a service provider that may be engaged by the banking institution 202 to verify credit card or debit card transactions on its behalf. Third party processor may maintain a third party database 209 that may store data that may be provided by banking institution 202 for the purposes of conducting electronic transaction verification on behalf of the banking institution 202.

Third party processor 208 may be accessible via a network 214 to retail location 210 having a point-of-sale (POS) terminal 212. The third party processor 208 may also be connected to various other retail locations via network 210, such as retail location 216 having POS terminal 218.

Presently, there are a number of available techniques that may be used by the third party processor 208 to accomplish PIN verification processing. One technique requires that all cryptographic keys and processing information available to the owning banking institution 202 also be available to the third party processor 208 such that the normal authorization processes done at the banking institution 202 can also be performed at the third party processor 208. A drawback to this approach is that highly sensitive cryptographic keys may need to be made available outside the banking institution 202's direct control. If this is done, it is possible that rogue personnel with the third party processor 208 could use the cryptographic keys to manufacture counterfeit cards with their respective PINs.

Another technique requires that encrypted PIN information be maintained at the banking institution 202 and at the third party processor 208 within client records (e.g., in a cardholder database in banking institution database 203 and third party database 209). With this approach, transaction processing requires that the encrypted PIN received from POS terminals 212, 218 be securely translated from encryption under a session key (used at the POS terminals 212, 218) to encryption under the database encryption key (used at the third party processor 208). The translated cryptogram may then be compared against the database cryptogram. A match between the session key and the database stored encryption key means that the same PIN was used. Although the PIN information stored in the third party database 209 is usually encrypted, the possibility exists that a rogue third party insider could translate the database encrypted PINs using that same database encryption key which may be available to that insider. It is then simply a matter of decrypting the PIN values for the entire database.

Another technique requires using two sets of cryptographic keys and two separate PIN algorithms. With this third technique, the banking institution 202 may use either of the two above approaches to process PINS—i.e., the banking institution 202 may calculate PINs via an algorithm, or it may store encrypted PIN values in a client database. A second, separate cryptographic key may then be provided to the third party processor 208. The banking institution 202 may use this cryptographic key to generate PIN Verification Values (PVV). For example, a PVV may be generated from encrypting the client account number (i.e. the credit card or debit card number) and the clear (i.e., unencrypted) value of an encrypted PIN. In this case, the algorithm requires an encrypted value which it may then securely decrypt within the confines of secure cryptographic hardware. The result is then passed through an extraction routine and, typically, a four-digit reference may be produced. With this third technique, the banking institution 202 creates the reference, and the third party processor 208 may use the PVV algorithm to verify the reference. In this case, the third party processor 208 does not have access to cryptographic information that can be used to manufacture credit/debit cards. Unfortunately, the PVV algorithms in use today typically only allow a relatively short fixed number of digits (typically 4 digits) which may allow the PIN to be hacked in a concerted effort.

As will now be described, a novel solution is provided which can significantly reduce the possibility that encrypted PIN information may be decrypted by the third party processor 208.

Figure 3:
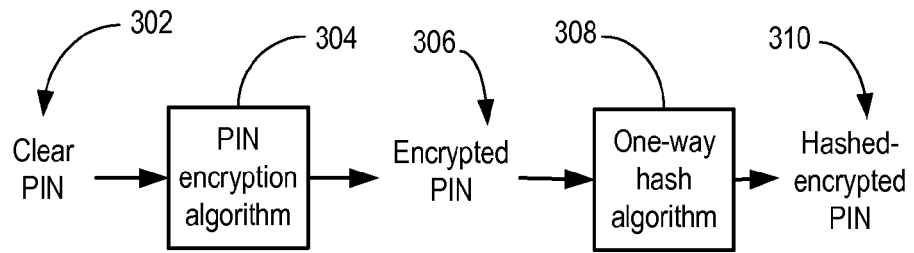
FIG. 3 shows a schematic block diagram of an illustrative PIN encryption system and method in accordance with an embodiment of the present invention.

Now referring to FIG. 3, shown is a schematic block diagram of a PIN encryption system and method in accordance with the present invention that may be provided at the banking institution 202 in the system 200 of FIG. 2. As shown, PIN encryption system 300 includes a PIN encryption algorithm module 304, and a one-way hash algorithm module 308. The PIN encryption algorithm module 304 may be configured to receive a clear PIN input 302, and to produce an encrypted PIN output 306. The one-way hash algorithm module 308 is configured to receive the encrypted PIN output 306 and produce a hashed-encrypted PIN output 310.

A corresponding method may proceed as follows: First, a PIN value provided at clear PIN input 302 is encrypted via a PIN encryption algorithm 304 to produce an encrypted PIN output 306. The PIN encryption 304 may be, for example, a third party database cryptographic key (e.g., ANSI X9.8, also known as ISO-0). Next, the encrypted PIN output 306 is passed through one-way hash algorithm 308 to produce a hashed-encrypted PIN output 310. The hash algorithm 308 used may be, for example, Secure Hash Algorithm (SHA)-256 or any other suitable hash algorithm. The resulting value (output of the one-way HASH) is now the obscured version of the encrypted PIN.

In an embodiment, the owning banking institution 202 (FIG. 2) may make available a shared encryption key (KPEV) to the third party processor 208. The banking institution 202 then translates all PIN values from encryption under a banking institution key to encryption under this shared KPEV.

Every time a customer changes their PIN (e.g., via customer PIN selection), the resulting encrypted PIN is again translated into encryption under the KPEV. The KPEV encrypted PIN is then processed through the one-way hash algorithm 308.

In an embodiment, the banking institution 202 may allow customers to have PINs that may have a variable number of digits. Although the PIN may be virtually any length, certain parameters may be set for a minimum number of characters and a maximum number of characters. By way of example, the minimum length may be 4 digits, and the maximum length may be 12 digits, as per PIN standards. Other minimum lengths are also possible.

In an embodiment, the original PIN may be encrypted in the ANSI X9.8 or ISO-0 format, for example, such that the encrypted values are unique. Using ANSI X9.8/ISO-0 format, even though a four digit PIN value can be from 0000 to 9999, all PINs may be virtually unique since the actual PIN may be exclusive OR'ed with, for example, the 12 most significant digits of a unique account number. Since the accounts are unique, the resulting PIN value will also be virtually unique.

Whatever the length or value of the PIN input at clear PIN input 302, PIN encryption algorithm module 304 and one-way hash algorithm module 308 translate the value into a hashed-encrypted PIN output 310. Since hashing is a one-way function, and as the PIN does not have a fixed number of values, it will be appreciated that the hashed-encrypted PIN output 310 will be highly resistant to hacking, and the clear PIN input 302 may not be reasonably recovered by the third-party processor 208. Thus, the hashed-encrypted PIN output 310 for each client PIN may be safely stored in the third party database 209 and made available to the third party processor 208 for secure PIN verification.

Figure 4:
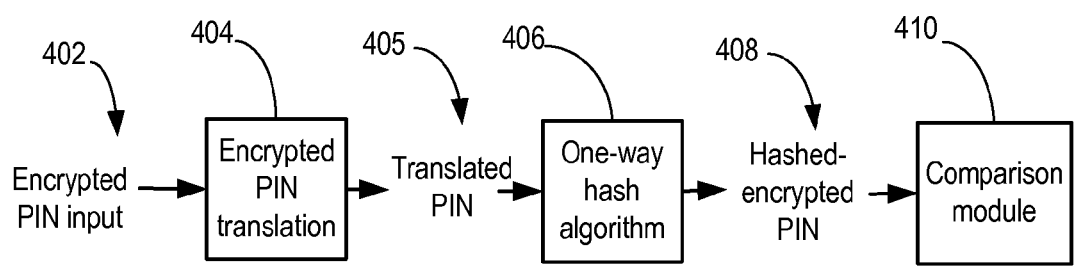
FIG. 4 shows a schematic block diagram of an illustrative PIN decryption system and method in accordance with an embodiment.

Now referring to FIG. 4, shown is a schematic block diagram of a third party PIN verification system and method that may be provided at the third party processor 208 (FIG. 2). As shown, the third party PIN verification system 400 may include an encrypted PIN translation module 404, a one-way hash algorithm module 406, and a comparison module 410. The encrypted PIN translation module 404 is configured to receive an encrypted PIN input 402 (e.g., from POS 212 or 218) and to produce a translated PIN output 405. The one-way hash algorithm module 406 is configured to receive the translated PIN output 405 and to produce a hashed-encrypted PIN output 408. The comparison module 410 is configured to compare the hashed-encrypted PIN output 408 to a previously stored hashed-encrypted PIN value (e.g., as may be stored in third party database 209).

A corresponding method may proceed as follows: Upon receiving a card verification request (e.g., from a customer using a credit card or debit card at POS 212 or 218), the PIN entered by the user may be received as an encrypted PIN input 402. In an embodiment, this encrypted PIN input 402 may be translated (e.g., by using the Encryption PIN translation module 404) by the third party processor 208 using a shared device encryption key to another encrypted form usable by the third party processor (i.e., the KPEV provided by the banking institution). Encryption PIN translation module 404 produces a translated PIN 405.

Thus, rather than comparing the converted encrypted PIN directly, as previously done, the third party processor 208 uses a one-way hash algorithm 406 provided in secure cryptographic hardware to produce a hashed-encrypted PIN output 408 from the translated PIN 405. This hashed-encrypted PIN 408 is then compared to the hashed-encrypted values previously stored in the third party database 209. As the third party processor 208 cannot practically reverse engineer the one-way hash algorithm used in one-way hash algorithm module 406, and does not know the length of the variable PIN used, the third party processor 308 does not have sufficient information to generate the original clear PINs. Effective control is thus retained by the banking institution 202.

In an embodiment, the present invention can further involve validation of a supplied token (e.g., a magnetically striped card as in credit or debit) to verify that, again, the owning banking institution 202 actually produced and generated a cryptographic checksum that verifies the original. This verification may happen both at the banking institution 202 when it does validation processing and also at the third party processor 208.

For example, credit card issuers use various card verification techniques (e.g., card verification value/card verification code/card security code—CVV/CVC/CSC) that involve the use of proprietary cryptographic keys. At the banking institution 202, the normal card verification algorithm may be used which can verify and also create valid tokens (e.g., CVV/CVC/CSC). The banking institution 202 then uses most of the data normally used for this verification, as well as the cryptographically generated checksum to then pass this modified data through the normal CVV/CVC/CSC algorithm. This value is then made available to the stand-in system and serves to validate that the supplied token was generated by the owning bank institution 202 (since the third party processing site uses the clear text, yet the owning bank institution securely generated the checksum) in its verification process. This means only the owning banking institution 202 can generate valid tokens and supply a new checksum (used only by the stand-in system) using the owning institution's securely generated checksum and new secure keys for the generation of the stand-in checksum. The third party processing system 208, not knowing the secure keys used by the banking institution 202, cannot then generate tokens that would be validated at either the banking institution 202 or stand-in third party sites.

During processing at the third party processor 208, the encrypted PIN value of an account is received (e.g., from POS devices 212, 218), then translated using the KPEV. The result is hashed and that result is then compared to the values resident in the third party database 404. To verify that the supplied magnetically striped card has been issued by the banking institution 202, it is possible to still use the CVV/CVC/CSC function. However, the banking institution 202 will create its true CVV/CVC/CSC value using its own secret cryptographic keys. The CVV/CVC/CSC value, as is customary, may still be written to the magnetic stripe of the client card. A separate CVV/CVC/CSC cryptographic key (hereinafter "KVCV") may then be shared with the third party processor 208.

Once the banking institution 202 has generated the true CVV/CVC/CSC value, the KVCV is then used to also process the CVV/CVC/CSC again, but this time, instead of using a SERVICE CODE field, the true CVV/CVC/CSC is used in its place. This helps to ensure that the resulting cryptographic "checksum" also includes, and is dependant on, the true CVV/CVC/CSC generated from the banking institution 202's cryptographic keys. This recalculated CVV/CVC/CSC is then also made available to the third party processor 208 and stored in the third party database 404 along with the above described hashed-encrypted PIN output 310.

Since this new CVV/CVC/CSC does not directly use the cryptographic keys of the original banking institution 202, the KVCV cannot be used to generate valid magnetic stripe cards. Thus, the CVV/CVC/CSC as described here is also a cryptographic one-way function such that the result cannot be used to recover the original source.

The above description has shown how to make PIN validation and CVV validation available to a third party processor 208 without exposing the true cryptographic keys that could be used to manufacture PINs and magnetic cards. Copying or compromising the database maintained at the third party processor will allow no viable attacks on true account information.

Not only can the above techniques be used to "secure" a third party outsourced system, but if the PIN technique is also used by the owning banking institution 202, rather than keeping a database of client information and associated encrypted PIN values, an owning institution's KPEV key can be used to translate true PINs, into hashed-encrypted PIN values. Attacks on this database to recover PINs would then be practically infeasible.

While various illustrative embodiments of the invention have been described above, it will be appreciated by those skilled in the art that variations and modifications may be made. Thus, the scope of the invention is defined by the following claims.

What is claimed is:

1. A method of processing a personal identification number (PIN), comprising:
encrypting at an owning institution processor a clear PIN input using an encryption algorithm to generate an owning institution encrypted PIN;

translating at the owning institution processor the owning institution encrypted PIN using a shared encryption key to generate a first encrypted PIN;
hashing at the owning institution processor the first encrypted PIN using a one-way hash algorithm to generate a first hashed and encrypted PIN in response to the clear PIN being securely encrypted, and the owning institution encrypted PIN being securely translated using the shared encryption key;
storing at a third party processor the first hashed and encrypted PIN,
wherein the first hashed and encrypted PIN remains hashed and encrypted while on the third party processor;
receiving at the third party processor a second encrypted PIN generated from a clear PIN input;
translating at the third party processor the second encrypted PIN into a third encrypted PIN using an encrypted PIN translation module including the shared encryption key,
wherein the third encrypted PIN is in a form usable by the third party processor, and
wherein the encrypted PIN translation module is configured to prevent the third party processor from accessing the encryption algorithm used to generate the owning institution encrypted PIN;
hashing at the third party processor the third encrypted PIN using a one-way hash algorithm module to generate a second hashed and encrypted PIN in response to secure translation of the second encrypted PIN into a third encrypted PIN using the shared encryption key,
wherein the one-way hash algorithm is contained within the one-way hash algorithm module, and
wherein the hashing is performed at the third party processor by the one-way hash algorithm module; and
comparing at the third party processor the second hashed and encrypted PIN to the stored first hashed and encrypted PIN to determine when the second hashed and encrypted PIN is generated from the same clear PIN input as that of the first hashed and encrypted PIN.

2. The method of claim 1, further comprising:
storing the shared encryption key on the third party processor; and
validating a supplied token.

3. The method of claim 1, wherein the encryption algorithm is contained in a PIN encryption algorithm module.

4. The method of claim 1, further comprising:
receiving at the owning institution processor a user generated clear PIN input.

5. The method of claim 4, wherein the user generated clear PIN input has a variable length, the method further comprising:
generating at the owning institution processor the first hashed and encrypted PIN from the variable length PIN, and storing at the third party processor the first hashed and encrypted PIN from the variable length PIN.

6. The method of claim 1, further comprising:
securing at the third party processor the one-way hash algorithm in cryptographic hardware.

7. A system for processing a personal identification number (PIN), comprising:
an encryption algorithm module provided at an owning institution processor, the encryption algorithm module configured to:
encrypt a clear PIN input to generate an owning institution encrypted PIN; and
translate the owning institution encrypted PIN using a shared encryption key to generate a first encrypted PIN;
a one-way hash algorithm module provided at the owning institution processor and configured to hash the first encrypted PIN and to generate a first hashed and encrypted PIN in response to the clear PIN being securely encrypted, and the owning institution encrypted PIN being securely translated using the shared encryption key;
storage provided at a third party processor for storing the first hashed and encrypted PIN,
wherein the first hashed and encrypted PIN remains hashed and encrypted while stored on the third party processor;
a PIN translator module provided at the third party processor for translating a second encrypted PIN into a third encrypted PIN using the shared encryption key,
wherein the third encrypted PIN is in a form usable by the third party processor, and
wherein the encrypted PIN translation module is configured to prevent the third party processor from accessing the encryption algorithm used to generate the owning institution encrypted PIN;
a one-way hash algorithm module provided at the third party processor for hashing the third encrypted PIN to generate a second hashed and encrypted PIN in response to secure translation of the second encrypted PIN into a third encrypted PIN using the shared encryption key,
wherein the one-way hash algorithm is contained within the one-way hash algorithm module, and
wherein the hashing is performed at the third party processor by the one-way hash algorithm module; and
a comparison module provided at the third party processor for comparing the second hashed and encrypted PIN to the stored first hashed and encrypted PIN to determine when the second hashed and encrypted PIN is generated from the same clear PIN input as that of the first hashed and encrypted PIN.

8. The system of claim 7, further comprising:
the shared encryption key stored on the third party processor.

9. The system of claim 7, further comprising:
cryptographic hardware provided at the third party processor for securing the one-way hash algorithm.

10. The system of claim 7, further comprising:
receiving means provided at the owning institution processor for receiving a user generated clear PIN input.

11. The system of claim 7, further comprising:
cryptographic hardware provided at the third party processor for securing the one-way hash algorithm.

12. A non-transitory computer readable medium storing computer code that when loaded into one or more data processors adapts the processors to provide, when executed, a method of processing a personal identification number (PIN), the non-transitory computer readable medium comprising:
code for encrypting at a owning institution processor a clear PIN input using an encryption algorithm to generate an owning institution encrypted PIN;
code for translating at the owning institution processor the owning institution encrypted PIN using a shared encryption key to generate a first encrypted PIN;
code for hashing at the owning institution processor the first encrypted PIN using a one-way hash algorithm to generate a first hashed and encrypted PIN in response to the clear PIN being securely encrypted, and the owning institution encrypted PIN being securely translated using the shared encryption key;

code for storing at a third party processor the first hashed and encrypted PIN, wherein the first hashed and encrypted PIN remains hashed and encrypted while on the third party processor;

code for receiving at the third party processor a second encrypted PIN generated from a clear PIN input;

code for translating at the third party processor the second encrypted PIN into a third encrypted PIN using an encrypted PIN translation module including the shared encryption key, wherein the third encrypted PIN is in a form usable by the third party processor, and wherein the encrypted PIN translation module is configured to prevent the third party processor from accessing the encryption algorithm used to generate the owning institution encrypted PIN;

code for hashing at the third party processor the third encrypted PIN using a one-way hash algorithm module to generate a second hashed and encrypted PIN in response to secure translation of the second encrypted PIN into a third encrypted PIN using the shared encryption key, wherein the one-way hash algorithm is contained within the one-way hash algorithm module, and wherein the hashing is performed at the third party processor by the one-way hash algorithm module; and code for comparing at the third party processor the second hashed and encrypted PIN to the stored first hashed and encrypted PIN to determine when the second hashed and encrypted PIN is generated from the same clear PIN input as that of the first hashed and encrypted PIN.

13. The non-transitory computer readable medium of claim 12, further comprising:
code for storing the shared encryption key on the third party processor.

14. The non-transitory computer readable medium of claim 12, further comprising:
code for receiving a user generated clear PIN input.

15. The non-transitory computer readable medium of claim 14, wherein the user generated clear PIN input has a variable length, the non-transitory computer readable medium further comprising:
code for generating the first hashed-encrypted PIN from the variable length PIN at the owning institution processor and storing the first hashed and encrypted PIN from the variable length PIN at the third party processor.

16. The non-transitory computer readable medium of claim 15, further comprising:
code for securely accessing the one-way hash algorithm secured in cryptographic hardware at the third party processor.

* * * * *